United States Patent
Luther et al.

(10) Patent No.: US 12,413,554 B2
(45) Date of Patent: Sep. 9, 2025

(54) DOMAIN NAME SYSTEM (DNS) SECURITY

(71) Applicant: Level 3 Communications, LLC, Broomfield, CO (US)

(72) Inventors: Dan Luther, Claremore, OK (US); Dean Ballew, Sterling, VA (US); John R. B. Woodworth, Amissvile, VA (US); Carol Dawn Lovell, West Monroe, LA (US); James C. Anders, Lee's Summit, MO (US); Lisa Lamanna, Harrisonburg, VA (US)

(73) Assignee: Level 3 Communications, LLC, Denver, CO (US)

( * ) Notice: Subject to any disclaimer, the term of this patent is extended or adjusted under 35 U.S.C. 154(b) by 133 days.

(21) Appl. No.: 18/428,609

(22) Filed: Jan. 31, 2024

(65) Prior Publication Data

US 2024/0267359 A1   Aug. 8, 2024

Related U.S. Application Data

(60) Provisional application No. 63/483,628, filed on Feb. 7, 2023.

(51) Int. Cl.
*H04L 9/40* (2022.01)
(52) U.S. Cl.
CPC ........ *H04L 63/0236* (2013.01); *H04L 63/101* (2013.01)
(58) Field of Classification Search
CPC .............. H04L 63/0236; H04L 63/101; H04L 61/4511; H04L 63/108; H04L 63/14
See application file for complete search history.

(56) References Cited

U.S. PATENT DOCUMENTS

| 9,396,330 B2 * | 7/2016 | Muthiah | H04L 67/561 |
| 9,756,071 B1 * | 9/2017 | Golshan | G06F 16/951 |
| 12,088,625 B2 * | 9/2024 | St. Pierre | H04L 63/1416 |

FOREIGN PATENT DOCUMENTS

EP   1459171   12/2012

OTHER PUBLICATIONS

International Search Report and Written Opinion of the International Searching Authority, dated Apr. 17, 2024, Int'l Appl. No. PCT/US24/013771, Int'l Filing Date Jan. 31, 2024; 11 pgs.

* cited by examiner

*Primary Examiner* — Amie C. Lin

(57) ABSTRACT

Novel tools and techniques are provided for implementing improvement to domain name system ("DNS") security. In various embodiments, a computing system may receive a user datagram protocol ("UDP")-based DNS request, and may send a UDP-based response message, which may include an empty payload portion and a header portion containing a truncate flag that is set, which indicates to resend the request as a transmission control protocol ("TCP")-based DNS request. When the TCP-based DNS request is received within a first period, the computing system may send, to the source address, a TCP-based response message comprising an answer to a query (in the TCP-based DNS request) for a destination DNS record associated with a destination device. If no TCP-based DNS request is received from the source address within the first period, the computing system may block all UDP-based DNS requests from the source address for at least a second period.

8 Claims, 9 Drawing Sheets

DOMAIN NAME SYSTEM (DNS) SECURITY

CROSS-REFERENCE TO RELATED APPLICATIONS

This application claims the benefit of U.S. Provisional Application No. 63/483,628 filed Feb. 7, 2023, entitled, "Domain Name System (DNS) Security," which is incorporated herein by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing domain name system ("DNS") functionality, and, more particularly, to methods, systems, and apparatuses for implementing improvement to DNS security, by requiring DNS queries to be reattempted.

BACKGROUND

User datagram protocol ("UDP")-based domain name system ("DNS") requests or packets can be easily source-spoofed, leading to its use in malicious network attacks as distributed denial of service ("DDoS") traffic. In fact, many well-orchestrated UDP-based DNS attacks can be virtually indistinguishable from normal DNS traffic.

It is with respect to this general technical environment to which aspects of the present disclosure are directed.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n," where n denotes any suitable integer number, and may be either the same or different from the suffix "n" for other components in the same or different figures. For example, for component #1 105a-105n, the integer value of n in 105n may be the same or different from the integer value of n in 110n for component #2 110a-110n, and so on.

DETAILED DESCRIPTION OF CERTAIN EMBODIMENTS

Overview

Figure 1:
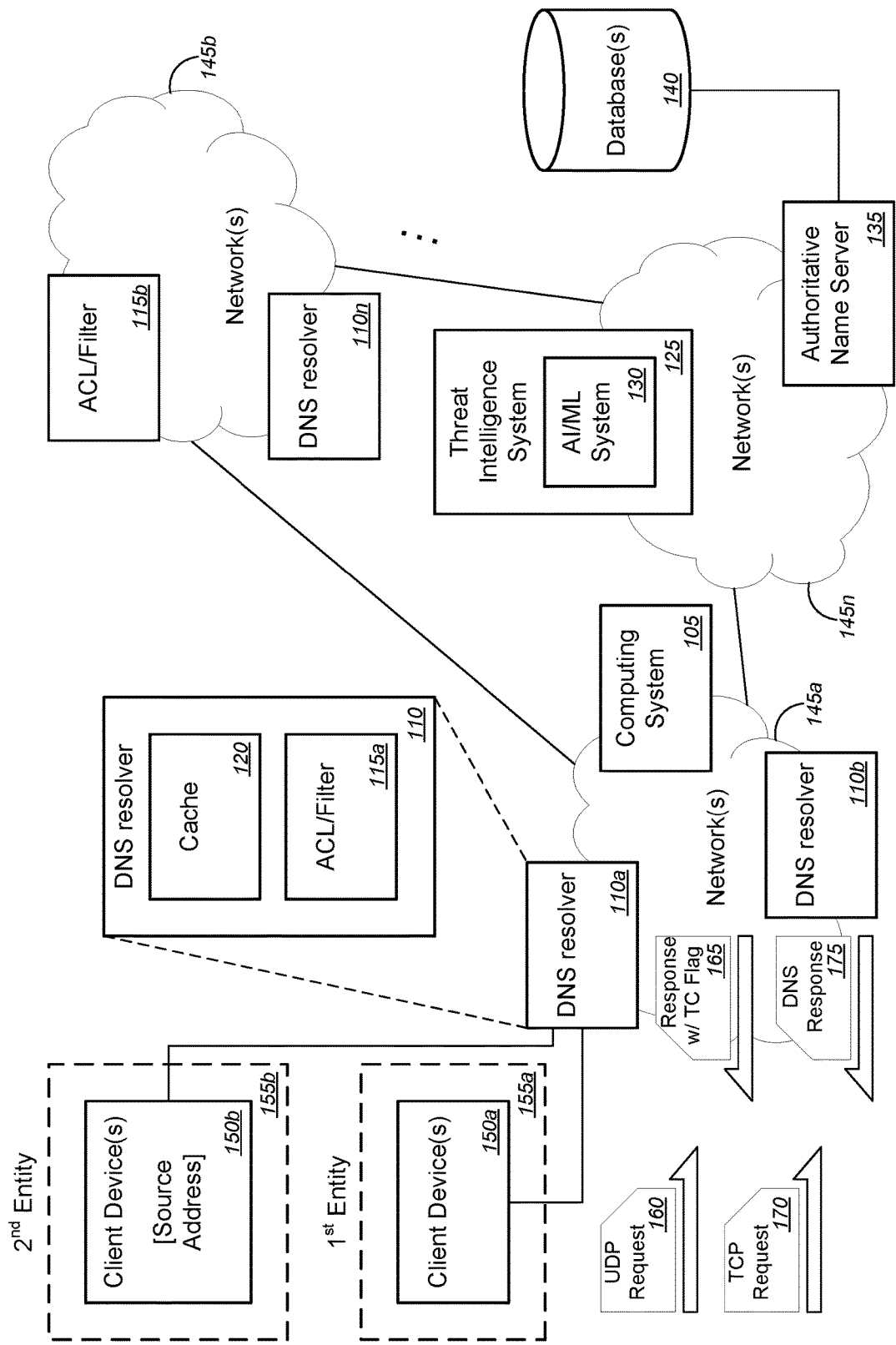
FIG. 1 is a schematic diagram illustrating a system for implementing improvement to DNS security, in accordance with various embodiments.

Various embodiments provide tools and techniques for implementing domain name system ("DNS") functionality, and, more particularly, to methods, systems, and apparatuses for implementing improvement to DNS security, by requiring DNS queries to be reattempted.

In various embodiments, a computing system may receive a first user datagram protocol ("UDP")-based DNS request, the first UDP-based DNS request including a source address and a query for a destination DNS record associated with at least one of a destination device in a network, a destination entity associated with the destination device, or a destination domain associated with the destination device or the destination entity. In response to receiving the first UDP-based DNS request, the computing system may send a UDP-based response message to the source address. In some instances, the response message may include an empty payload portion and a header portion containing a truncate ("TC") flag that is set. When a first transmission control protocol ("TCP")-based DNS request corresponding to the first UDP-based DNS request is received from the source address within a first predetermined period, the computing system may send, to the source address, a TCP-based response message comprising an answer to the query for the destination DNS record. When a TCP-based DNS request corresponding to the first UDP-based DNS request is not received from the source address within the first predetermined period, the computing system may cause one or more second UDP-based DNS requests from the source address to be blocked. In some cases, the one or more second UDP-based DNS requests may include the first UDP-based DNS request.

In this manner, the various embodiments leverage the features of the truncate flag as a novel feature for improving DNS security. The truncate flag is conventionally used in a UDP response that exceeds 512 bytes in payload size (and thus has its payload truncated) to request or indicate resending of a UDP message (to which the UDP response is responding to) as a TCP message, so that a corresponding TCP response (which is not bound by the 512 byte payload limitation) may be sent. For example, a query from a new client's source IP address (or source port) may be received and an empty response may be returned with the truncated flag set. The client's behavior would be to reattempt the query via TCP. This retry indicates the source IP address (or source port) will be temporarily trusted for UDP traffic. Additional UDP attempts, while being evaluated, may be fed into an AI/ML system to determine whether or not to ban or block the source IP address (or source port), and for how long. Because IP addresses are ephemeral, the AI/ML system may provide additional tracking to ensure the client's behavior has not soured and/or to remove any imposed bans.

These and other aspects of the improvement to DNS security are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method may comprise receiving, by a computing system of a domain name system ("DNS"), a first user datagram protocol ("UDP")-based DNS request, the first UDP-based DNS request comprising a source address and a query for a destination DNS record associated with at least one of a destination device in a network, a destination entity associated with the destination device, or a destination domain associated with the destination device or the destination entity; in response to receiving the first UDP-based DNS request, sending, by the computing system, a UDP-based response message to the source address, the UDP-based response message comprising an empty payload portion and a header portion containing a truncate ("TC") flag that is set; when a first transmission control protocol ("TCP")-based DNS request corresponding to the first UDP-based DNS request is received from the source address within a first predetermined period, sending, by the computing system and to the source address, a TCP-based response message comprising an answer to the query for the destination DNS record; and when a TCP-based DNS request corresponding to the first UDP-based DNS request is not received from the source address within the first predetermined period, causing, by the computing system, UDP-based DNS requests from the source address to be blocked.

In some embodiments, the computing system may comprise at least one of a DNS resolver, a DNS recursive resolver ("recursor"), a DNS root nameserver, a top level domain ("TLD") nameserver, an authoritative nameserver, a threat intelligence system, a threat mitigation system, a server, an artificial intelligence ("AI") system, a machine learning ("ML") system, a virtual machine ("VM"), or software running on the computing system, and/or the like. In some cases, the response message may comprise an empty payload portion. In some instances, the source address may comprise at least one of a source port or a source IP address.

According to some embodiments, sending the TCP-based response message may comprise one of: sending, by the computing system and to the source address, the destination DNS record based on the first UDP-based DNS request, the destination DNS record being obtained from at least one of a cache of the computing system or an authoritative nameserver search; or sending, by the computing system and to the source address, a message indicating that the destination DNS record was not found.

In some embodiments, the method may further comprise after receiving the first TCP-based DNS request corresponding to the first UDP-based DNS request, updating, by the computing system, one or more rules of at least one access control list ("ACL") to grant access to the network to the source address.

According to some embodiments, the method may further comprise, after receiving the first TCP-based DNS request corresponding to the first UDP-based DNS request, performing at least one of: causing, by the computing system, one or more second UDP-based DNS requests that are received by the computing system from the source address to be processed; or causing, by the computing system, a threat intelligence system to communicate to each of a plurality of DNS resolvers to allow one or more third UDP-based DNS requests that are received by the plurality of DNS resolvers from the source address to be processed.

In some embodiments, the method may further comprise causing, by the computing system, one or more fourth UDP-based DNS requests that are received, within a second predetermined period after receiving the first TCP-based DNS request, from the source address to be processed.

In some examples, the method may further comprise analyzing, by the computing system and using a machine learning model, one or more fifth UDP-based DNS requests that are received after the second predetermined period, from the source address, to determine whether or not to block the one or more fifth UDP-based DNS requests; and performing, by the computing system, one or more DNS tasks based on the analysis.

In some embodiments, causing the UDP-based DNS requests from the source address to be blocked may comprise at least one of: updating, by the computing system, one or more rules of at least one access control list ("ACL") to deny access to the network to the source address; dropping, by the computing system, all DNS requests from the source address; or filtering, by the computing system, all DNS requests from the source address; and/or the like. In some cases, causing the first UDP-based DNS request from the source address to be blocked may comprise causing, by the computing system, all DNS requests that are received from the source address over a third predetermined period to be blocked.

According to some embodiments, the method may further comprise dropping, by the computing system, any one or more sixth UDP-based DNS requests that are received from the source address after receiving the first UDP-based DNS request and before receiving the first TCP-based DNS request.

Merely by way of example, in some cases, at least one of a query, a query type, a query source, or a mail exchange ("MX") record of the first UDP-based DNS request may be the same as corresponding at least one of a query, a query type, a query source, or a MX record of the first TCP-based DNS request.

In some embodiments, the method may further comprise determining, by the computing system, whether the first UDP-based DNS request is a legitimate DNS request, by performing at least one of: determining, by the computing system, that the first UDP-based DNS request is among a number of UDP-based DNS requests that exceeds a predetermined number of requests within a fourth predetermined period and that are received from the source address; or determining, by the computing system, that an ACL already indicates that the source address should be denied access to the network; and/or the like.

In another aspect, a system may comprise a computing system of a domain name system ("DNS"). The computing system may comprise at least one first processor and a first non-transitory computer readable medium communicatively coupled to the at least one first processor. The first non-transitory computer readable medium may have stored thereon computer software comprising a first set of instructions that, when executed by the at least one first processor, causes the computing system to: receive a first user datagram protocol ("UDP")-based DNS request, the first UDP-based DNS request comprising a source address and a query for a destination DNS record associated with at least one of a destination device in a network, a destination entity associated with the destination device, or a destination domain associated with the destination device or the destination entity; in response to receiving the first UDP-based DNS request, send a UDP-based response message to the source address, the UDP-based response message comprising an empty payload portion and a header portion containing truncate ("TC") flag that is set; when a first transmission control protocol ("TCP")-based DNS request corresponding to the first UDP-based DNS request is received from the source address within a first predetermined period, send, to the source address, a TCP-based response message comprising an answer to the query for the destination DNS record; and when a TCP-based DNS request corresponding to the first UDP-based DNS request is not received from the source address within the first predetermined period, cause UDP-based DNS requests from the source address to be blocked.

In some embodiments, the computing system may comprise at least one of a DNS resolver, a DNS recursive resolver ("recursor"), a DNS root nameserver, a top level domain ("TLD") nameserver, an authoritative nameserver, a threat intelligence system, a threat mitigation system, a server, an artificial intelligence ("AI") system, a machine learning ("ML") system, a virtual machine ("VM"), or software running on the computing system, and/or the like. In some instances, the response message may comprise an empty payload portion. In some instances, the source address may comprise at least one of a source port or a source IP address.

According to some embodiments, causing the UDP-based DNS requests from the source address to be blocked may comprise at least one of: updating one or more rules of at least one access control list ("ACL") to deny access to the network to the first source address; dropping all DNS requests from the first source address; or filtering all DNS requests from the first source address; and/or the like.

In yet another aspect, a method may comprise receiving, by a computing system of a domain name system ("DNS"), a first user datagram protocol ("UDP")-based DNS request, the first UDP-based DNS request comprising a source address and a query for a destination DNS record associated with at least one of a destination device in a network, a destination entity associated with the destination device, or a destination domain associated with the destination device or the destination entity; in response to receiving the first UDP-based DNS request, sending, by the computing system, a UDP-based response message to the source address, the UDP-based response message comprising an empty payload portion and a header portion containing a truncate ("TC") flag that is set; and when a transmission control protocol ("TCP")-based DNS request corresponding to the first UDP-based DNS request is not received from the source address within a first predetermined period, causing, by the computing system, one or more second UDP-based DNS requests from the source address to be blocked, the one or more second UDP-based DNS requests comprising the first UDP-based DNS request. The method may further comprise, when a first TCP-based DNS request corresponding to the first UDP-based DNS request is received from the source address within the first predetermined period, allowing, by the computing system and within a second predetermined period after receiving the first TCP-based DNS request, at least the first UDP-based DNS request from the source address to be processed, by sending, by the computing system and to the source address, at least a TCP-based response message comprising an answer to the query for the destination DNS record; receiving, by the computing system and from the source address, one or more third UDP-based DNS requests, after the second predetermined period; analyzing, by the computing system and using a machine learning model, the one or more third UDP-based DNS requests, to determine whether or not to block the one or more third UDP-based DNS requests; and performing, by the computing system, one or more DNS tasks based on the analysis.

According to some embodiments, the computing system may comprise at least one of a DNS resolver, a DNS recursive resolver ("recursor"), a DNS root nameserver, a top level domain ("TLD") nameserver, an authoritative nameserver, a threat intelligence system, a threat mitigation system, a server, an artificial intelligence ("AI") system, a machine learning ("ML") system, a virtual machine ("VM"), or software running on the computing system, and/or the like.

In some embodiments, causing the one or more second UDP-based DNS requests from the source address to be blocked may comprise at least one of: updating, by the computing system, one or more rules of at least one access control list ("ACL") to deny access to the network to the source address; dropping, by the computing system, all DNS requests from the source address; or filtering, by the computing system, all DNS requests from the source address; and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

SPECIFIC EXEMPLARY EMBODIMENTS

We now turn to the embodiments as illustrated by the drawings. FIGS. 1-5 illustrate some of the features of the method, system, and apparatus for implementing domain name system ("DNS") functionality, and, more particularly, to methods, systems, and apparatuses for implementing improvement to DNS security, by requiring DNS queries to be reattempted, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 is a schematic diagram illustrating a system 100 for implementing improvement to DNS security, in accordance with various embodiments.

In the non-limiting embodiment of FIG. 1, system 100 may include, without limitation, at least one of computing system 105, one or more DNS resolvers 110a-110n (collectively, "DNS resolvers 110" or the like), one or more access control lists ("ACLs") or filters 115a and/or 115b (collectively, "ACL or filter 115" or the like), cache 120, threat intelligence system 125, artificial intelligence ("AI")/machine learning ("ML") system 130, authoritative name server or nameserver 135, database(s) or DNS database(s) 140, one or more networks 145a-145n (collectively, "network(s) 145" or the like), one or more first client devices 150a associated with a first entity 155a, or one or more second client devices 150b associated with a second entity 155b, and/or the like. According to some embodiments, ACL or filter 115a and cache 120 may be integrated with or within each of at least one DNS resolver 110 among the one or more DNS resolvers 110a-110n, while ACL or filter 115b may be disposed in a network(s) 145 and external to any DNS resolver 110a-110n, in some cases as part of a router ACL or filter or as part of a third party ACL or filter (as shown, e.g., in FIG. 2 or 3, or the like). Each ACL or filter 115 may indicate which source addresses (e.g., source ports and/or source Internet Protocol ("IP") addresses, or the like) are granted or denied access to the network(s) (in this case, network(s) 145, or the like, and thus determine to which source addresses the DNS system will return DNS responses (e.g., destination DNS records, or the like) to DNS queries, or the like. Herein, destination DNS records may include, but is not limited to, at least one of one or more destination A records (each including an IPv4 address of a destination domain, or the like), one or more destination AAAA records (each including an IPv6 address of a destination domain, or the like), one or more destination message exchange ("MX") records (each including routing information to a destination mail server, or the like), one or more destination nameserver ("NS") records (each including authoritative DNS server information for a destination domain), or one or more other DNS records or DNS record types, or the like. In some instances, AI/ML system 130 may be integrated with threat intelligence system 125. Alternatively, AI/ML system 130 may be separate from, yet communicatively coupled with, threat intelligence system 125 (not shown). In some embodiments, each of computing system 105, each DNS resolver among DNS resolvers 110a-110n, threat intelligence system 125, and authoritative name server 135 and corresponding database(s) 140 may be disposed within a network(s) 145 among the one or more networks 145a-145n. In some cases, database(s) 140 may be a distributed database spanning a number of networks among the one or more networks 145a-145n.

In some embodiments, the computing system 105 may include, without limitation, at least one of a DNS resolver (e.g., DNS resolver 110 among the one or more DNS resolvers 110a-110n, or the like), a DNS recursive resolver ("recursor," which may be configured to query other DNS resolvers 110 or DNS servers for the destination DNS record; herein, each DNS resolver 110 represents either a DNS resolver or a DNS recursor, or the like), a DNS root nameserver, a top level domain ("TLD") nameserver, an authoritative nameserver, a threat intelligence system (e.g., threat intelligence system 125, or the like), a threat mitigation system (similar to threat intelligence system 125, or the like), a server, an AI system or a ML system (e.g., AI/ML system 130, or the like), a virtual machine ("VM"), or software (e.g., daemon, script, or other software, or the like) running on the computing system 105, and/or the like. In some cases, the authoritative nameserver 135 may include at least one of the DNS root nameserver, the TLD nameserver, and/or the authoritative nameserver, and/or the like. In some instances, the one or more client devices 150a or 150b may each include, but is not limited to, one of a desktop computer, a laptop computer, a tablet computer, a smart phone, a mobile phone, a server, a cloud computing system, a distributed computing system, or any suitable device capable of communicating with a DNS resolver (e.g., DNS resolver 110 or 110a-110n, or the like) and/or other computing system (e.g., computing system 105, or the like) via a web-based portal, a web browser, an application programming interface ("API"), a server, a software application ("app"), or any other suitable communications interface, or the like, over network(s) 145a-145n. In some cases, the entity 155a or 155b may include, without limitation, an individual, a group of individuals, a company, a group of companies, a (foreign) government actor, a (foreign) government agency, or an alliance of (foreign) governmental actors, agencies, and/or entities, or the like.

According to some embodiments, network(s) 145a-145n may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 145a-145n may include an access network of the service provider (e.g., an Internet service provider ("ISP")). In another embodiment, the network(s) 145a-145n may include a core network of the service provider and/or the Internet.

In operation, at least one of computing system 105, DNS resolver 110a among the one or more DNS resolvers 110a-110n, ACL or filter 115a or 115b, threat intelligence system 125, and/or AI/ML system 130 (collectively, "computing system" or the like) may receive a first user datagram protocol ("UDP")-based DNS request (e.g., UDP request 160, or the like), the first UDP-based DNS request including a source address and a query for a destination DNS record associated with at least one of a destination device (not shown) in a network (e.g., network(s) 145, or the like), a destination entity (not shown) associated with the destination device, or a destination domain (not shown) associated with the destination device or the destination entity. In response to receiving the first UDP-based DNS request, the computing system may send a UDP-based response message (e.g., response message 165, or the like) to the source address. In some cases, the source address may include, without limitation, at least one of a source port or a source IP address, and/or the like. In some instances, the response message may include an empty payload portion and a header portion containing a truncate ("TC") flag that is set, the set TC flag in the response message may indicate for the source address to resend the first UDP-based DNS request as a transmission control protocol ("TCP")-based DNS request.

In this manner, the computing system may send the empty UDP response with the TC flag set, without performing any other DNS-based tasks until a TCP-based DNS request is received from the source address. In the case that the source address is associated with the requesting client device (e.g., source address associated with client device(s) 150b that is associated with the second entity 155b, or the like), the sending client device is more likely to be a legitimate requester and thus more likely to send a TCP-based DNS request in response to the UDP-based response with TC flag set. In the case that the source address is not associated with the requesting client device (e.g., the requesting client device(s) 150a that is associated with the first entity 155a attempts to spoof the source address of client device(s) 150b that is associated with the second entity 155b, or the like), for UDP-based responses that reach the second client device (s) 150b that is associated with the source address, the second client device(s) 150b may determine that it did not send the first UDP-based DNS request, and thus would not send a TCP-based DNS request in response. Alternatively, for UDP-based response that reach the first client device(s) 150a, in the case that first client device(s) 150a is used for sending high volume UDP-based DNS requests (e.g., as part of a distributed denial of service ("DDoS") attack, or the like), it would not likely respond to the UDP-based response as its resources are likely devoted to mass sending of UDP-based DNS requests, and thus would not likely sent a TCP-based DNS request in response.

When a first TCP-based DNS request (e.g., TCP request 170, or the like) corresponding to the first UDP-based DNS request (e.g., UDP request 160, or the like) is received from the source address within a first predetermined period (e.g., 50, 100, 150, 200, 250, 300, 350, 400, 450, or 500 ms, or 1, 2, 3, 4, 5, 10, 15, 20, 25, 30, 40, 50, or 60 s, or 2, 3, 4, 5, 10, 15, or 20 minutes, or a period within a range between 1 and 500 ms, between 1 and 100 ms, between 1 and 50 ms, between 1 and 60 s, between 1 and 30 s, between 1 and 15 s, between 1 and 20 minutes, between 1 and 10 minutes, or between 1 and 5 minutes, or the like), the computing system may send, to the source address, a TCP-based response message comprising an answer to the query for the destination DNS record. Herein, in some examples, for the first TCP-based DNS request to correspond to the first UDP-based DNS request, at least one of a query, a query type, a query source, or a mail exchange ("MX") record of the first UDP-based DNS request should be the same as corresponding at least one of a query, a query type, a query source, or a MX record of the first TCP-based DNS request, or vice versa.

When a TCP-based DNS request corresponding to the first UDP-based DNS request is not received from the source address within the first predetermined period, the computing system may cause one or more second UDP-based DNS requests from the source address to be blocked. In some cases, the one or more second UDP-based DNS requests may include the first UDP-based DNS request.

According to some embodiments, sending the TCP-based response message may comprise: the computing system sending, to the source address, the destination DNS record, in some cases, by returning, in a DNS response (e.g., DNS response 175, or the like), the destination DNS record for the destination device being obtained from at least one of a cache (e.g., cache 120, or the like) of the computing system or an authoritative nameserver search (e.g., a search of authoritative nameserver 135 and/or corresponding database(s) 140, or the like). Alternatively, sending the TCP-based response message may comprise: the computing system sending, to the source address, a message indicating that the destination DNS record was not found.

In some embodiments, for "a grant access condition," the computing system may after receiving the first TCP-based DNS request corresponding to the first UDP-based DNS request, update one or more rules of at least one ACL (e.g., ACL or filter 115a or 115b, or the like) to grant access to the network to the source address (i.e., to grant the source address access to the network and thus to allow communications between the source address and the destination device, assuming the destination DNS record can be found, or the like). Alternatively, or additionally, for "a grant access condition," the computing system may after receiving the first TCP-based DNS request corresponding to the first UDP-based DNS request, perform at least one of: causing one or more second UDP-based DNS requests that are received by the computing system from the source address to be processed; or causing a threat intelligence system (e.g., threat intelligence system 125, or the like) to communicate to each of a plurality of DNS resolvers (e.g., DNS resolvers 110b-110n among the one or more DNS resolvers 110a-110n, or the like) to allow one or more third UDP-based DNS requests that are received by the plurality of DNS resolvers from the source address to be processed. Alternatively, or additionally, for "a grant access condition," the computing system may cause one or more fourth UDP-based DNS requests that are received, within a second predetermined period (e.g., 50, 100, 150, 200, 250, 300, 350, 400, 450, or 500 ms, or 1, 2, 3, 4, 5, 10, 15, 20, 25, 30, 40, 50, or 60 s, or 2, 3, 4, 5, 10, 15, or 20 minutes, or a period within a range between 1 and 500 ms, between 1 and 100 ms, between 1 and 50 ms, between 1 and 60 s, between 1 and 30 s, between 1 and 15 s, between 1 and 20 minutes, between 1 and 10 minutes, or between 1 and 5 minutes, or the like) after receiving the first TCP-based DNS request, from the source address to be processed. Herein, causing UDP-based DNS requests to be processed may refer to obtaining a destination DNS record(s) in response to queries in the UDP-based DNS requests from at least one of the cache of the computing system or the authoritative nameserver search, and/or to sending a message indicating that the destination DNS record(s) was(were) not found, or the like.

In some embodiments, the computing system may analyze, using a machine learning model (e.g., a ML model of AI/ML system 130, or the like), one or more fifth UDP-based DNS requests that are received after the second predetermined period, from the source address, to determine whether or not to block the one or more fifth UDP-based DNS requests. Based on such analysis, the computing system may perform one or more DNS tasks, including, but not limited to, at least one of configuring a DNS client (either by configuring static domain name resolution or by configuring dynamic domain name resolution, configuring a DNS proxy, configuring DNS spoofing, specifying a source interface for DNS packets, configuring a DNS trusted interface, or setting a differentiated services code point ("DSCP") value for outgoing DNS packets, or the like).

In some embodiments, causing the one or more second UDP-based DNS requests from the source address to be blocked [herein also referred to as "a deny access condition"] may comprise the computing system performing at least one of: updating one or more rules of at least one ACL (e.g., ACL or filter 115a or 115b, or the like) to deny access to the network to the source address (i.e., to deny the source address from accessing the network and thus from communicating with the destination device, or the like); dropping all DNS requests from the source address; or filtering all DNS requests from the source address; and/or the like. Alternatively, or additionally, causing the one or more second UDP-based DNS requests from the source address to be blocked may comprise the computing system causing the DNS requests that are received from the source address over a third predetermined period (e.g., 50, 100, 150, 200, 250, 300, 350, 400, 450, or 500 ms, or 1, 2, 3, 4, 5, 10, 15, 20, 25, 30, 40, 50, or 60 s, or 2, 3, 4, 5, 10, 15, 20, 30, 40, 50, 60 minutes, or 2, 3, 4, 5, 6, 12, 18, or 24 hours, or 2, 3, 4, 5, 6, or 7 days, or a period within a range between 1 and 500 ms, between 1 and 100 ms, between 1 and 50 ms, between 1 and 60 s, between 1 and 30 s, between 1 and 15 s, between 1 and 60 minutes, between 1 and 30 minutes, between 1 and 10 minutes, between 1 and 5 minutes, between 1 and 24 hours, between 1 and 18 hours, between 1 and 12 hours, between 1 and 6 hours, or between 1 and 7 days, or the like) to be blocked.

According to some embodiments, the computing system may drop any one or more sixth UDP-based DNS requests that are received from the source address after receiving the first UDP-based DNS request and before receiving the first TCP-based DNS request.

In some embodiments, the computing system may determine whether the first UDP-based DNS request is a legitimate DNS request, in some cases, by performing at least one of: determining that the first UDP-based DNS request is among a number of UDP-based DNS requests that exceeds a predetermined number of requests within a fourth predetermined period (e.g., 50, 100, 150, 200, 250, 300, 350, 400, 450, or 500 ms, or 1, 2, 3, 4, 5, 10, 15, 20, 25, 30, 40, 50, or 60 s, or 2, 3, 4, 5, 10, 15, or 20 minutes, or a period within a range between 1 and 500 ms, between 1 and 100 ms, between 1 and 50 ms, between 1 and 60 s, between 1 and 30 s, between 1 and 15 s, between 1 and 20 minutes, between 1 and 10 minutes, or between 1 and 5 minutes, or the like) and that are received from the source address; or determining that an ACL (e.g., ACL or filter 115a or 115b, or the like) already indicates that the source address should be denied access to the network; and/or the like.

In another aspect, the computing system may receive a first UDP-based DNS request (e.g., UDP request 160, or the like), the first UDP-based DNS request including a source address and a query for a destination DNS record associated with at least one of a destination device (not shown) in a network (e.g., network(s) 145, or the like), a destination entity (not shown) associated with the destination device, or a destination domain (not shown) associated with the destination device or the destination entity. In response to receiving the first UDP-based DNS request, the computing system may send a UDP-based response message (e.g., response message 165, or the like) to the source address. In some instances, the UDP-based response message may include, but is not limited to, an empty payload portion and a header portion containing a TC flag that is set, the set TC flag in the header portion of the response message indicating for the source address to resend the first UDP-based DNS request as a TCP-based DNS request. When a TCP-based DNS request corresponding to the first UDP-based DNS request is not received from the source address within a first predetermined period (similar to the first predetermined period described above), the computing system may cause one or more second UDP-based DNS requests from the source address to be blocked. In some cases, the one or more second UDP-based DNS requests may include the first UDP-based DNS request.

When a first TCP-based DNS request (e.g., TCP request 170, or the like) corresponding to the first UDP-based DNS request (e.g., UDP request 160, or the like) is received from the source address within the first predetermined period, the computing system may allow, within a second predetermined period (similar to the second predetermined period described above) after receiving the first TCP-based DNS request, at least the first UDP-based DNS request from the source address to be processed, in some cases, by sending, to the source address, at least a TCP-based response message comprising an answer to the query for the destination DNS record. The computing system may (subsequently) receive, from the source address, one or more third UDP-based DNS requests, after the second predetermined period. The computing system may analyze, using a machine learning model (e.g., a ML model of AI/ML system 130, or the like), the one or more third UDP-based DNS requests, to determine whether or not to block the one or more third UDP-based DNS requests; and may perform one or more DNS tasks (similar to the DNS tasks described above) based on the analysis.

These and other functions of the system 100 (and its components) are described in greater detail below with respect to FIGS. 2-4.

Figure 2:
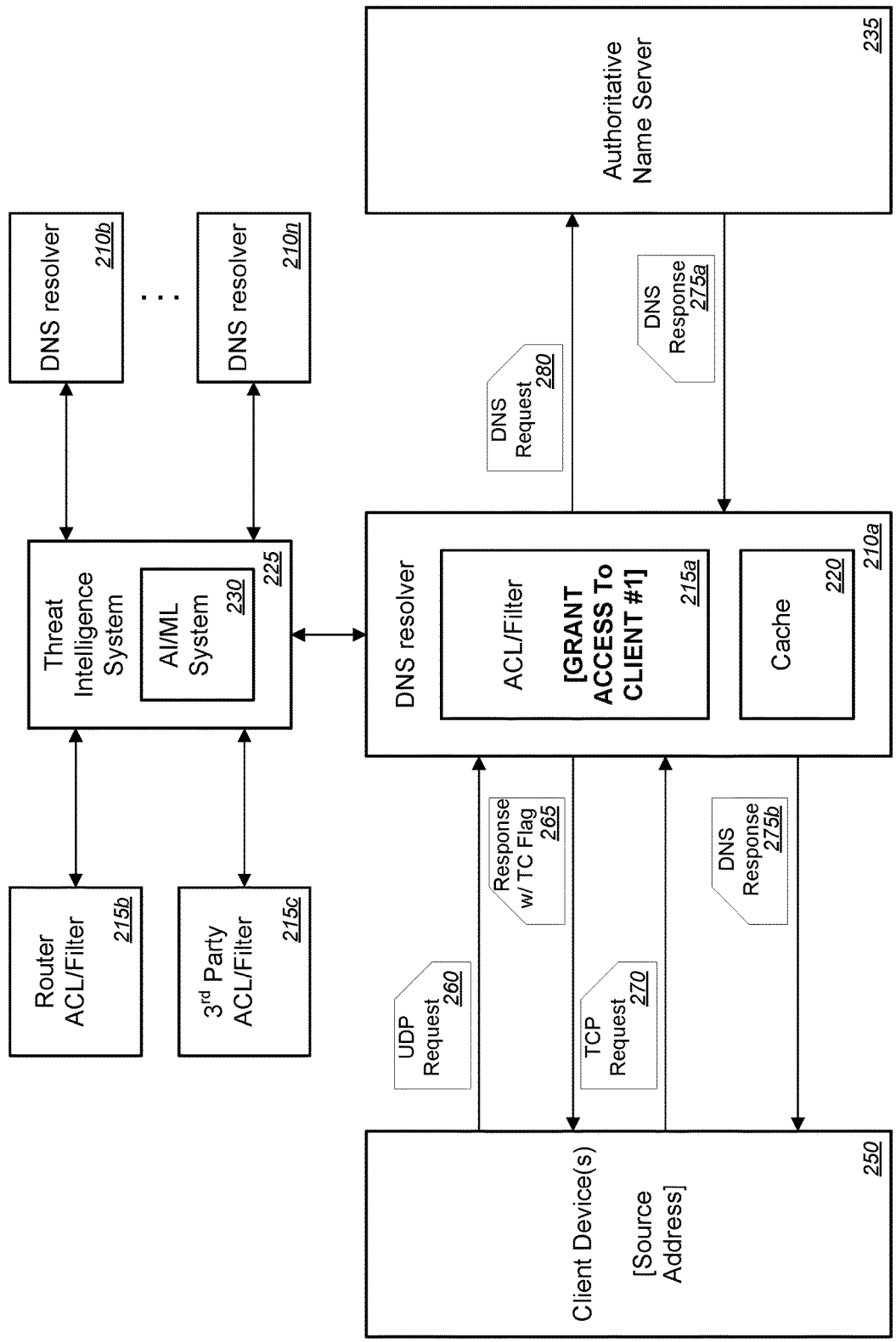
FIG. 2 is a schematic diagram illustrating a non-limiting example of a grant access condition when implementing improvement to DNS security, in accordance with various embodiments.

FIG. 2 is a schematic diagram illustrating a non-limiting example 200 of a grant access condition when implementing improvement to DNS security, in accordance with various embodiments.

In some embodiments, DNS resolvers 210a-210n, ACL or filter 215a, ACL or filter 215b or 215c, cache 220, threat intelligence system 225, AI/ML system 230, authoritative nameserver 235, client device(s) 250, UDP request 260, response 265, TCP request 270, and DNS response 275 of FIG. 2 may be similar, if not identical, to the one or more DNS resolvers 110 and 110a-110n, ACL or filter 115a, ACL or filter 115b, cache 120, threat intelligence system 125, AI/ML system 130, authoritative nameserver 135, client device(s) 150a or 150b, UDP request 160, response 165, TCP request 170, and DNS response 175, respectively, of system 100 of FIG. 1, and the description of these components of system 100 of FIG. 1 are similarly applicable to the corresponding components of FIG. 2.

In operation, DNS resolver 210a may receive UDP request 260 from client device(s) 250. The UDP request 260 may include, without limitation, a source address (including, but not limited to, at least one of a source port or a source IP address, and/or the like) and a query for a destination DNS record associated with at least one of a destination device (not shown) in a network (e.g., network(s) 145 of FIG. 1, or the like), a destination entity (not shown) associated with the destination device, or a destination domain (not shown) associated with the destination device or the destination entity. One of, or a combination of two or more of, DNS resolver 210a, ACL or filter 215a, router ACL or filter 215b, third party ACL or filter 215c, threat intelligence system 225, and/or AI/ML system 230 (collectively, "computing system" or the like) may send UDP-based response message 265, which is a message having an empty payload portion and having its TC flag set. The set TC flag in the UDP-based response message may indicate for the client device(s) 250 to resend the UDP request 260 as a TCP-based DNS request. In this manner, the various embodiments leverage the features of the truncate flag as a novel feature for improving DNS security. The truncate flag is conventionally used in a UDP response that exceeds 512 bytes in payload size (and thus has its payload truncated) to request or indicate resending of a UDP message (to which the UDP response is responding to) as a TCP message, so that a corresponding TCP response (which is not bound by the 512 byte payload limitation) may be sent.

In the event that client device(s) 250 sends TCP request 270 corresponding to UDP request 260, and the computing system receives the TCP request 270 within a first window of response (e.g., the first predetermined period as described above with respect to FIG. 1, or the like) and (optionally) determines that the DNS request is legitimate, the computing system may allow UDP requests (including UDP request 260, as well as any other UDP requests received from client device(s) 250 within a second window of response (e.g., the second predetermined period as described above with respect to FIG. 1, or the like) after receiving the TCP request 270) that are received from client device(s) 250 and/or other devices associated with the source address, or the like, to be processed, thereby granting access to the network(s) (e.g., network(s) 145 of FIG. 1, or the like). For instance, the computing system may process the query for the destination DNS record, by first searching a cache (e.g., cache 220 or the like) that is communicatively coupled with (or integrated with) the computing system. If the destination DNS record is contained in the cache, the computing system may send DNS response 275b (with the destination DNS record retrieved from the cache) to the client device(s) 250. If not contained in the cache, the computing system may send a DNS request 280 relaying the query for the destination DNS record to authoritative nameserver 235. If found by the authoritative nameserver 235 (e.g., from database(s) 140 of FIG. 1, or the like), then the authoritative nameserver 235 may send DNS response 275a (with the found destination DNS record) to the computing system, which may forward DNS response 275a as DNS response 275b to the client device(s) 250. If not found, the DNS responses 275a an 275b would include a message indicating that the destination DNS record was not found.

According to some embodiments, the computing system may communicate to each of a plurality of DNS resolvers (e.g., DNS resolvers 210b-210n among the one or more DNS resolvers 210a-210n, or the like) to allow one or more other UDP-based DNS requests from the at least one of the client device(s) 250 or one or more other client devices associated with either the source address and/or the entity associated with the source address (not shown) to be processed and the query for any other destination DNS records in such other UDP-based DNS requests to be responded to by the DNS system.

Figure 3:
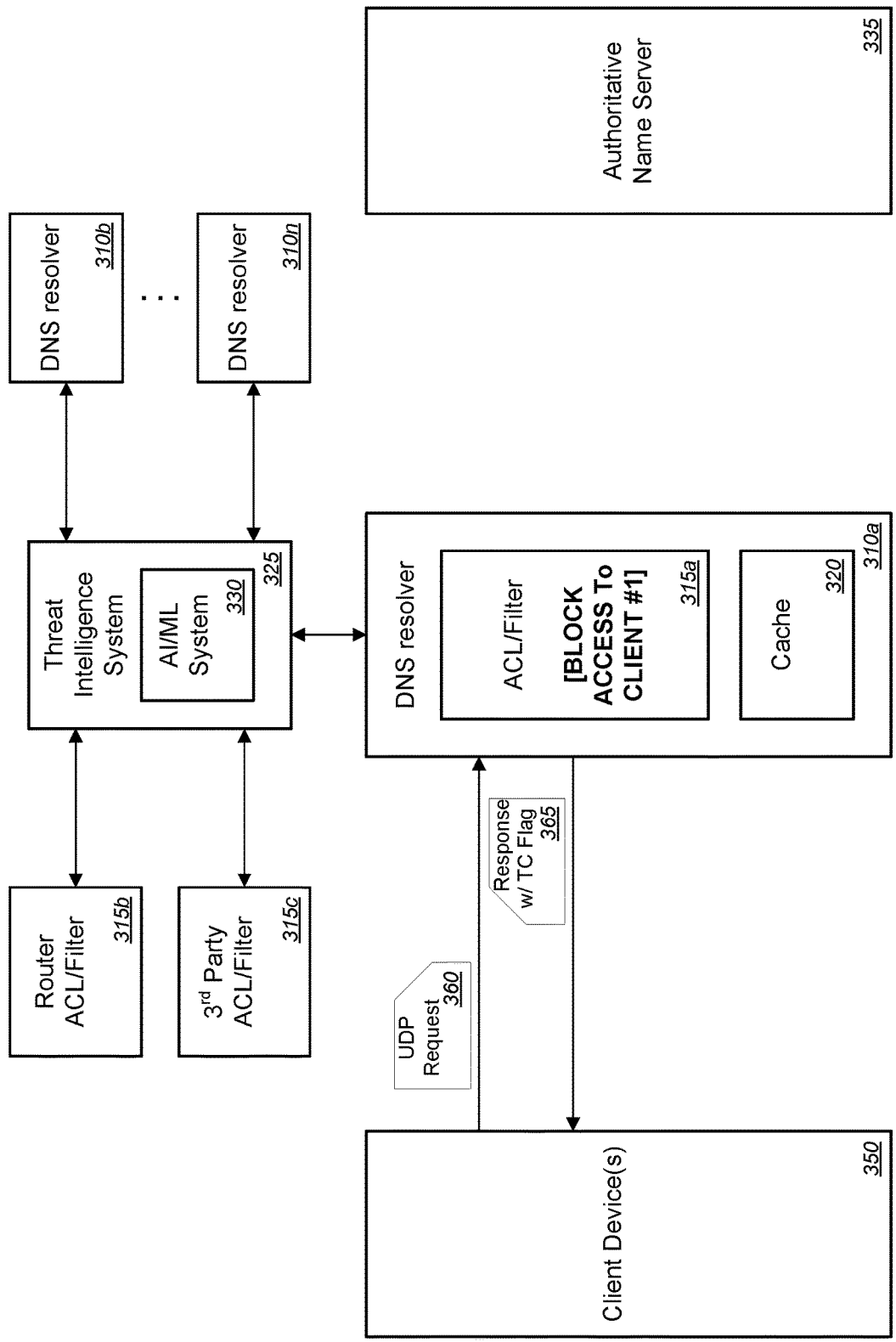
FIG. 3 is a schematic diagram illustrating a non-limiting example of a deny access condition when implementing improvement to DNS security, in accordance with various embodiments.

These and other functions of the example 200 (and its components) are described in greater detail herein with respect to FIGS. 1, 3, and 4.

FIG. 3 is a schematic diagram illustrating a non-limiting example 300 of a deny access condition when implementing improvement to DNS security, in accordance with various embodiments.

In some embodiments, DNS resolvers 310a-310n, ACL or filter 315a, ACL or filter 315b or 315c, cache 320, threat intelligence system 325, AI/ML system 330, authoritative nameserver 335, client device(s) 350, UDP request 360, and response 365 of FIG. 3 may be similar, if not identical, to the one or more DNS resolvers 110 and 110a-110n, ACL or filter 115a, ACL or filter 115b, cache 120, threat intelligence system 125, AI/ML system 130, authoritative nameserver 135, client device(s) 150a or 150b, UDP request 160, and response 165, respectively, of system 100 of FIG. 1, and the description of these components of system 100 of FIG. 1 are similarly applicable to the corresponding components of FIG. 2. Similarly, DNS resolvers 310a-310n, ACL or filter 315a-315c, cache 320, threat intelligence system 325, AI/ML system 330, authoritative nameserver 335, client device(s) 350, UDP request 360, and response 365 of FIG. 3 may be similar, if not identical, to DNS resolvers 210a-210n, ACL or filter 215a-215c, cache 220, threat intelligence system 225, AI/ML system 230, authoritative nameserver 235, client device(s) 250, UDP request 260, and response 265, respectively, of example 200 of FIG. 2, and the description of these components of example 200 of FIG. 2 are similarly applicable to the corresponding components of FIG. 3.

In operation, after sending the response message 365 (similar to sending of response message 265 in the non-limiting example of FIG. 2, or the like), in the event that client device(s) 350 fails to send a TCP request corresponding to UDP request 360 (such as TCP request 270 of FIG. 2, or the like), within the first window of response, the computing system may determine that the DNS request is not legitimate, and may block subsequent UDP requests from client device(s) 350, from devices associated with the source address, and/or from the entity with which client device(s) 350 and/or source address is associated, thereby blocking access to the network(s) (e.g., network(s) 145 of FIG. 1, or the like).

According to some embodiments, the computing system may communicate to each of a plurality of DNS resolvers (e.g., DNS resolvers 310b-310n among the one or more DNS resolvers 310a-310n, or the like) to deny access to the network(s) to one or more other UDP-based DNS requests from the at least one of the client device(s) 350 or one or more other client devices associated with either the source address and/or the corresponding entity (not shown).

These and other functions of the example 300 (and its components) are described in greater detail herein with respect to FIGS. 1, 2, and 4.

FIGS. 4A-4F (collectively, "FIG. 4") are flow diagrams illustrating a method 400 for implementing improvement to DNS security, in accordance with various embodiments. Method 400 of FIG. 4A continues onto FIG. 4F following the circular marker denoted, "A," and returns to FIG. 4A following the circular marker denoted, "B." Method 400 of FIG. 4A continues onto FIG. 4C following the circular marker denoted, "C," and returns to FIG. 4A following the circular marker denoted, "D." Method 400 of FIG. 4A continues onto FIG. 4E following the circular marker denoted, "E," and returns to FIG. 4A following the circular marker denoted, "D."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

Figure 4A:
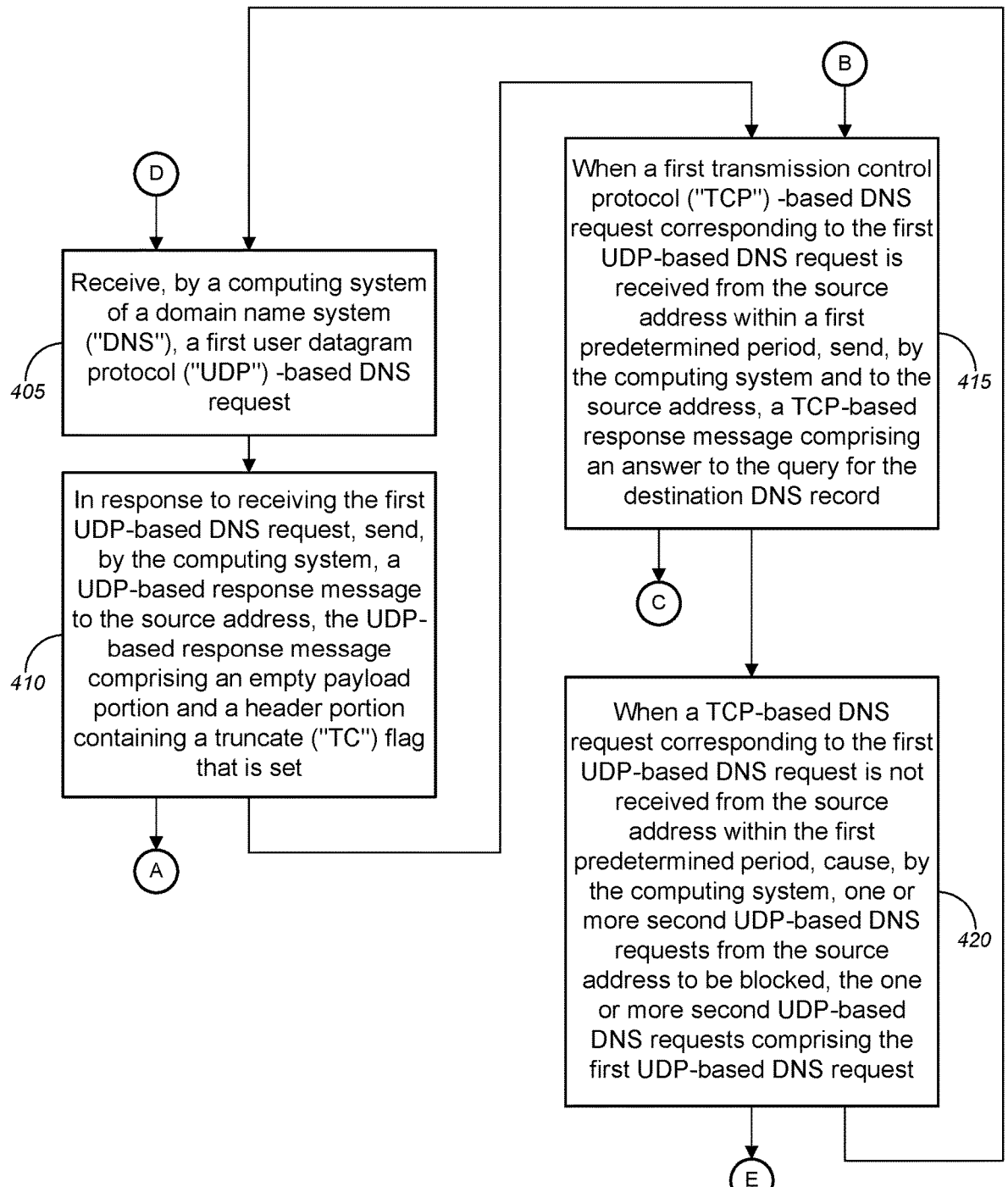
FIGS. 4A-4F are flow diagrams illustrating a method for implementing improvement to DNS security, in accordance with various embodiments.

In the non-limiting embodiment of FIG. 4A, method 400, at block 405, may comprise receiving, by a computing system of a domain name system ("DNS"), a first user datagram protocol ("UDP")-based DNS request. In some cases, the first UDP-based DNS request may include, but is not limited to, a source address and a query for a destination DNS record associated with at least one of a destination device in a network, a destination entity associated with the destination device, or a destination domain associated with the destination device or the destination entity.

At block 410, method 400 may comprise, in response to receiving the first UDP-based DNS request, sending, by the computing system, a UDP-based response message to the source address, the UDP-based response message including an empty payload portion and a header portion containing a truncate ("TC") flag that is set. In some instances, the set TC flag in the UDP-based response message may indicate for the source address to resend the first UDP-based DNS request as a transmission control protocol ("TCP")-based DNS request.

In some embodiments, the computing system may include, but is not limited to, at least one of a DNS resolver, a DNS recursive resolver ("recursor"), a DNS root nameserver, a top level domain ("TLD") nameserver, an authoritative nameserver, a threat intelligence system, a threat mitigation system, a server, an artificial intelligence ("AI") system, a machine learning ("ML") system, a virtual machine ("VM"), or software running on the computing system, and/or the like. In some cases, the source address may include, without limitation, at least one of a source port or a source IP address, and/or the like.

In some examples, method 400 may continue from the process at block 410 onto the process at block 415. In other examples, method 400 may continue onto the process at block 485 in FIG. 4F following the circular marker denoted, "A," before returning to the process at block 415 in FIG. 4A, as indicated by the circular marker denoted, "B."

At block 415, method 400 may comprise, when a first TCP-based DNS request corresponding to the first UDP-based DNS request is received from the source address within a first predetermined period, sending, by the computing system and to the source address, a TCP-based response message comprising an answer to the query for the destination DNS record. Merely by way of example, in some cases, for the first TCP-based DNS request to correspond to the first UDP-based DNS request, at least one of a query, a query type, a query source, or a mail exchange ("MX") record of the first UDP-based DNS request should be the same as corresponding at least one of a query, a query type, a query source, or a MX record of the first TCP-based DNS request, or vice versa.

In some examples, method 400 may return from the process at block 415 onto the process at block 420. In other examples, method 400 may continue onto one or more of the process at block 435, the process at block 440, the process at block 445, and/or the process at block 450, or the like, as shown in FIG. 4C, each following the circular marker denoted, "C" in FIG. 4A, before returning to the process at block 405 in FIG. 4A, as indicated by the circular marker denoted, "D."

Method 400 may further comprise, at block 420, when a TCP-based DNS request corresponding to the first UDP-based DNS request is not received from the source address within the first predetermined period, causing, by the computing system, one or more second UDP-based DNS requests from the source address to be blocked, the one or more second UDP-based DNS requests comprising the first UDP-based DNS request.

In some examples, method 400 may return from the process at block 420 onto the process at block 405. In other examples, method 400 may continue onto the process at block 475 in FIG. 4E following the circular marker denoted, "E," before returning to the process at block 405 in FIG. 4A, as indicated by the circular marker denoted, "D."

Figure 4B:
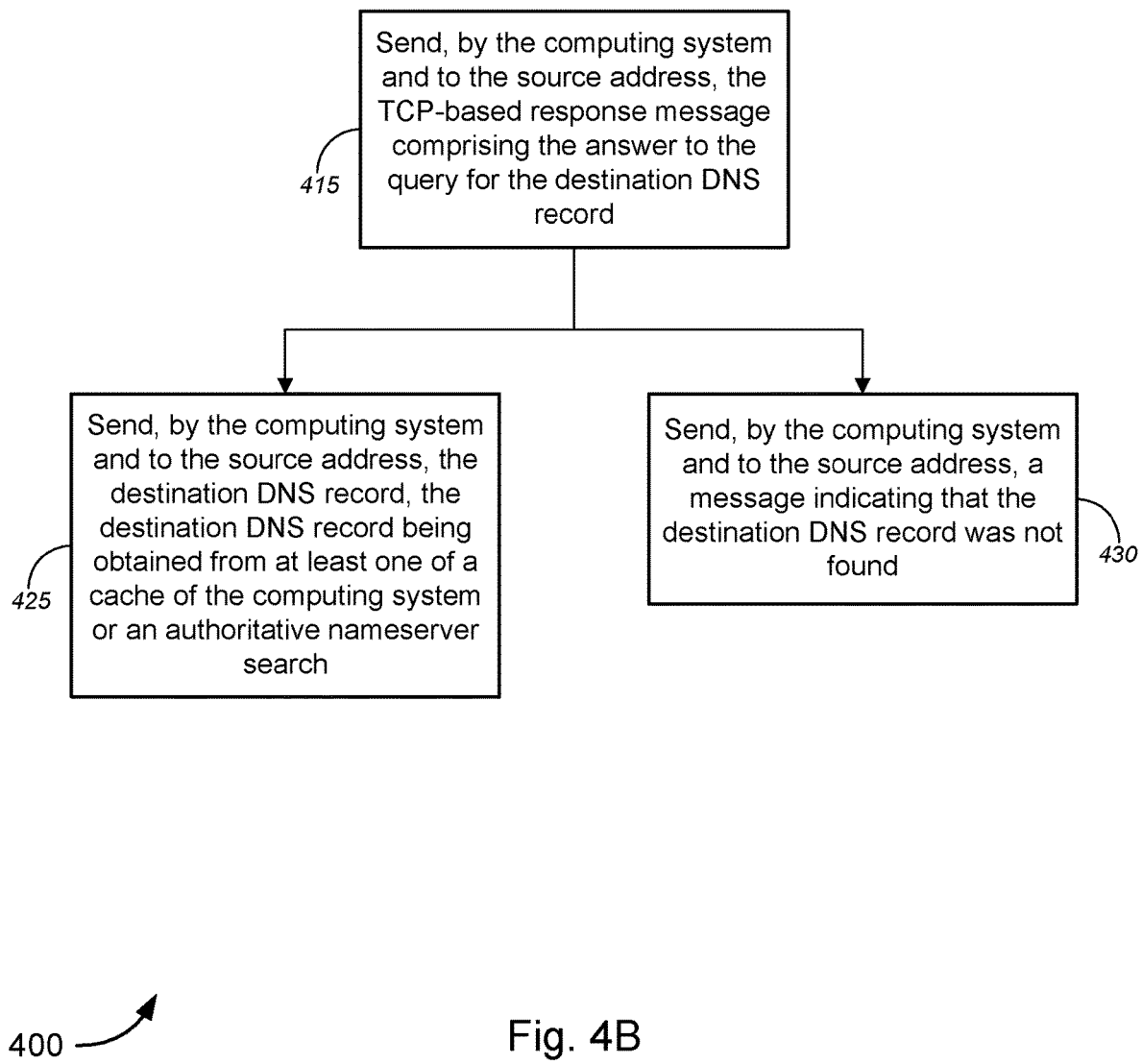
Figure 4C:
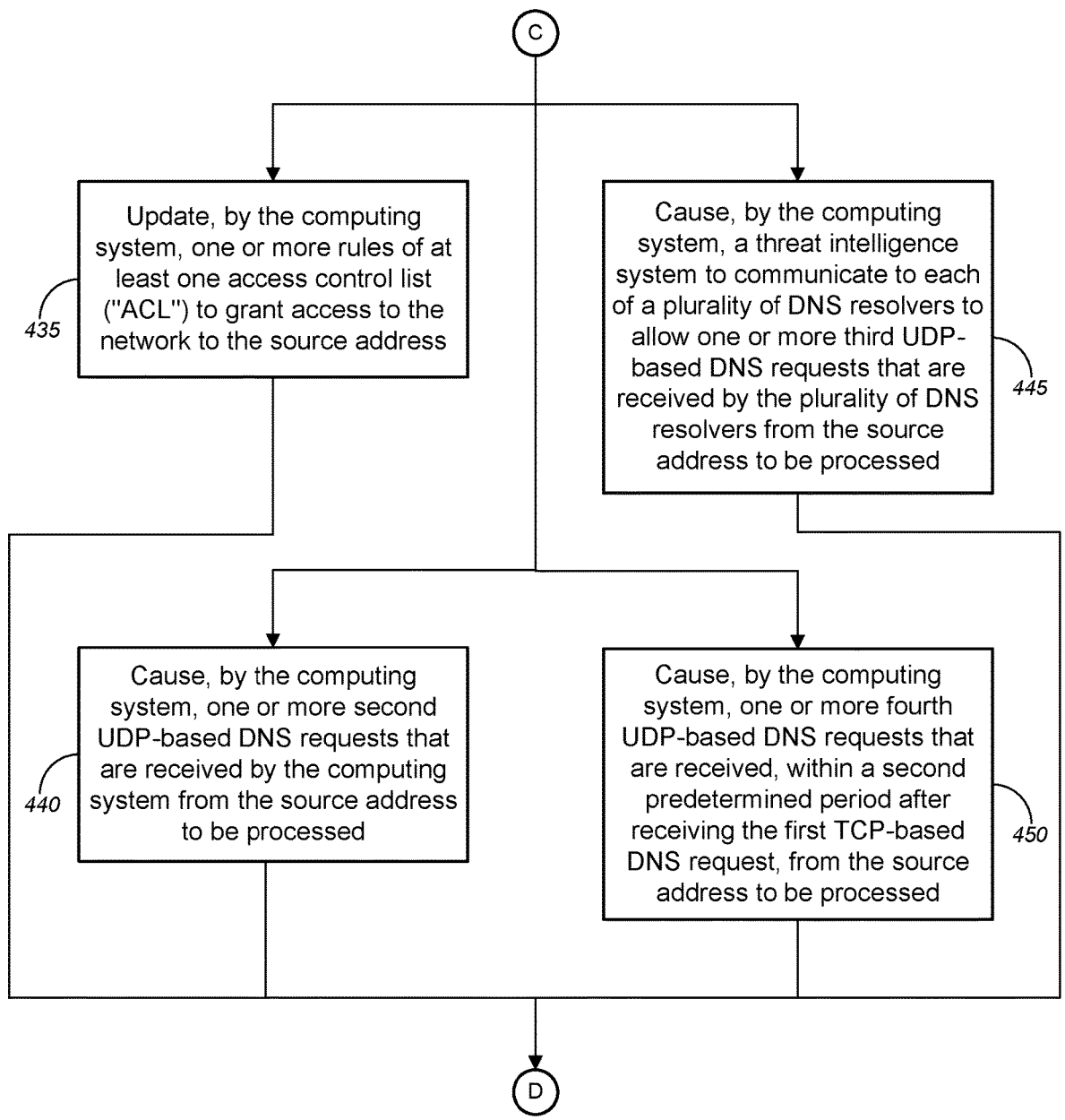

With reference to the non-limiting example of FIG. 4B, sending the TCP-based response message (at block 415) may comprise one of: sending, by the computing system and to the source address, the destination DNS record based on the first UDP-based DNS request and/or the first TCP-based DNS request, the destination DNS record being obtained from at least one of a cache of the computing system or an authoritative nameserver search (block 425); or sending, by the computing system and to the source address, a message indicating that the destination DNS record was not found (block 430).

Referring to the non-limiting example of FIG. 4C, following the circular marker denoted, "C," in FIG. 4A), method 400 may comprise, after receiving the first TCP-based DNS request corresponding to the first UDP-based DNS request, at least one of: updating, by the computing system, one or more rules of at least one access control list ("ACL") to grant access to the network to the source address (block 435); causing, by the computing system, one or more second UDP-based DNS requests that are received by the computing system from the source address to be processed (block 440); causing, by the computing system, a threat intelligence system to communicate to each of a plurality of DNS resolvers to allow one or more third UDP-based DNS requests that are received by the plurality of DNS resolvers from the source address to be processed (block 445); or causing, by the computing system, one or more fourth UDP-based DNS requests that are received, within a second predetermined period after receiving the first TCP-based DNS request, from the source address to be processed (block 450). Herein, causing UDP-based DNS requests to be processed may refer to obtaining a destination DNS record(s) in response to queries in the UDP-based DNS requests from at least one of the cache of the computing system or the authoritative nameserver search, and/or to sending a message indicating that the destination DNS record(s) was (were) not found, or the like.

Method 400 may return to the process at block 405 in FIG. 4A following the circular marker denoted, "D."

Figure 4D:
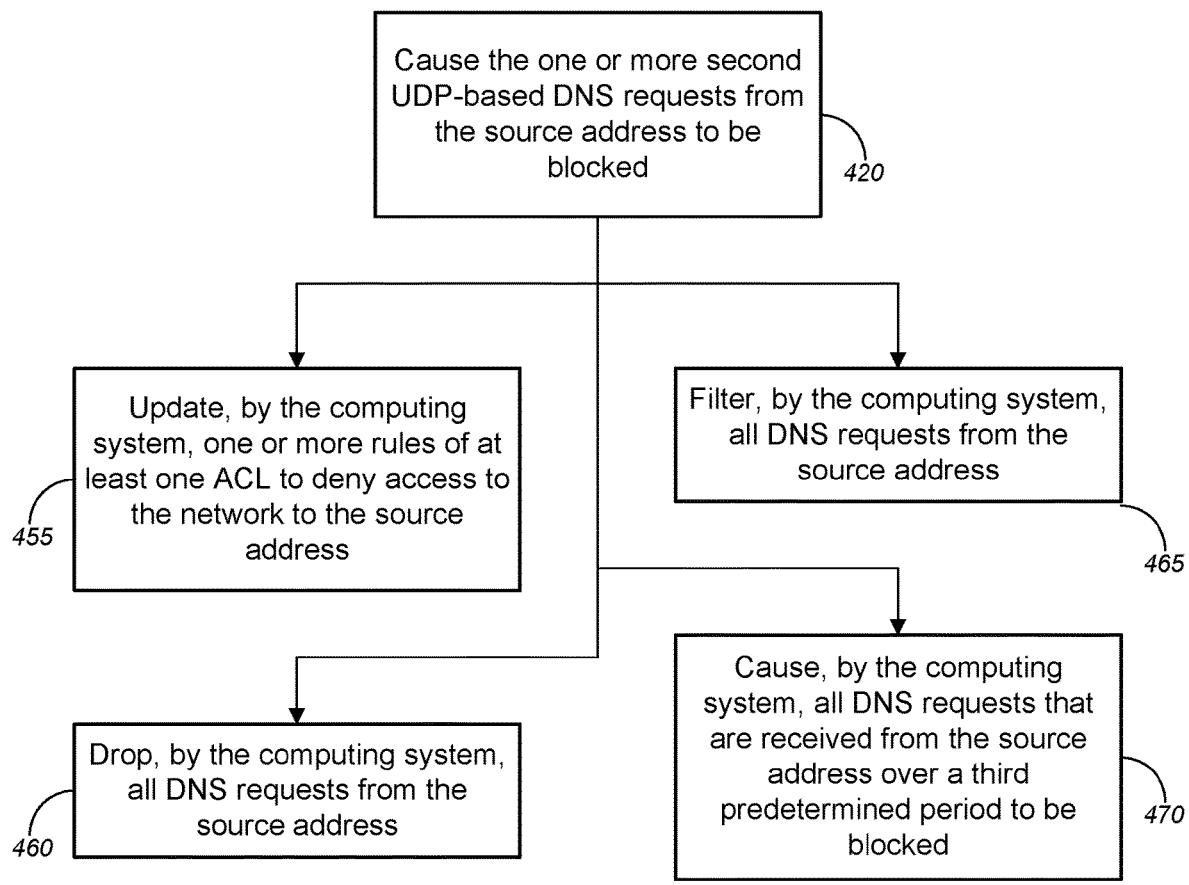

Referring to the non-limiting example of FIG. 4D, causing the one or more second UDP-based DNS requests from the source address to be blocked (at block 420) may comprise at least one of: updating, by the computing system, one or more rules of at least one ACL to deny access to the network to the source address (block 455); dropping, by the computing system, all DNS requests from the source address (block 460); filtering, by the computing system, all DNS requests from the source address (block 465); or causing, by the computing system, all DNS requests that are received from the source address over a third predetermined period to be blocked (block 470); and/or the like.

Figures 4E, 4F:
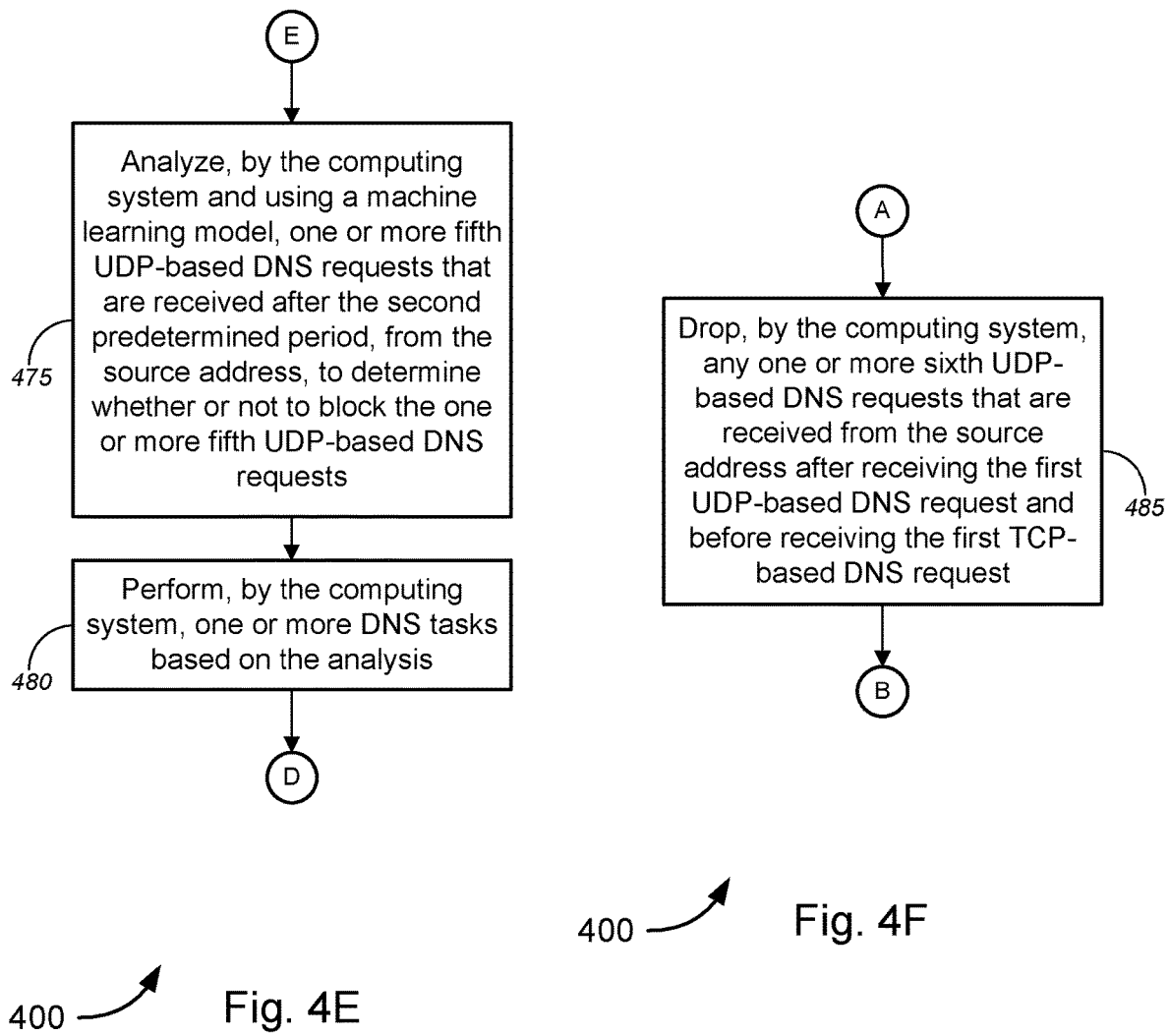

At block 475 in FIG. 4E (following the circular marker denoted, "E," in FIG. 4A), method 400 may comprise analyzing, by the computing system and using a machine learning model, one or more fifth UDP-based DNS requests that are received after the second predetermined period, from the source address, to determine whether or not to block the one or more fifth UDP-based DNS requests; and performing, by the computing system, one or more DNS tasks based on the analysis (block 480).

Method 400 may return to the process at block 405 in FIG. 4A following the circular marker denoted, "D."

At block 485 in FIG. 4E (following the circular marker denoted, "A," in FIG. 4A), method 400 may comprise dropping, by the computing system, any one or more sixth UDP-based DNS requests that are received from the source address after receiving the first UDP-based DNS request and before receiving the first TCP-based DNS request.

Method 400 may return to the process at block 415 in FIG. 4A following the circular marker denoted, "B."

In some embodiments, method 400 may further comprise determining whether the first UDP-based DNS request is a legitimate DNS request (not shown), which may comprise at least one of: determining, by the computing system, that the first UDP-based DNS request is among a number of UDP-based DNS requests that exceeds a predetermined number of requests within a fourth predetermined period and that are received from the source address (not shown); or determining, by the computing system, that an ACL already indicates that the source address should be denied access to the network (not shown); and/or the like.

Exemplary System and Hardware Implementation

Figure 5:
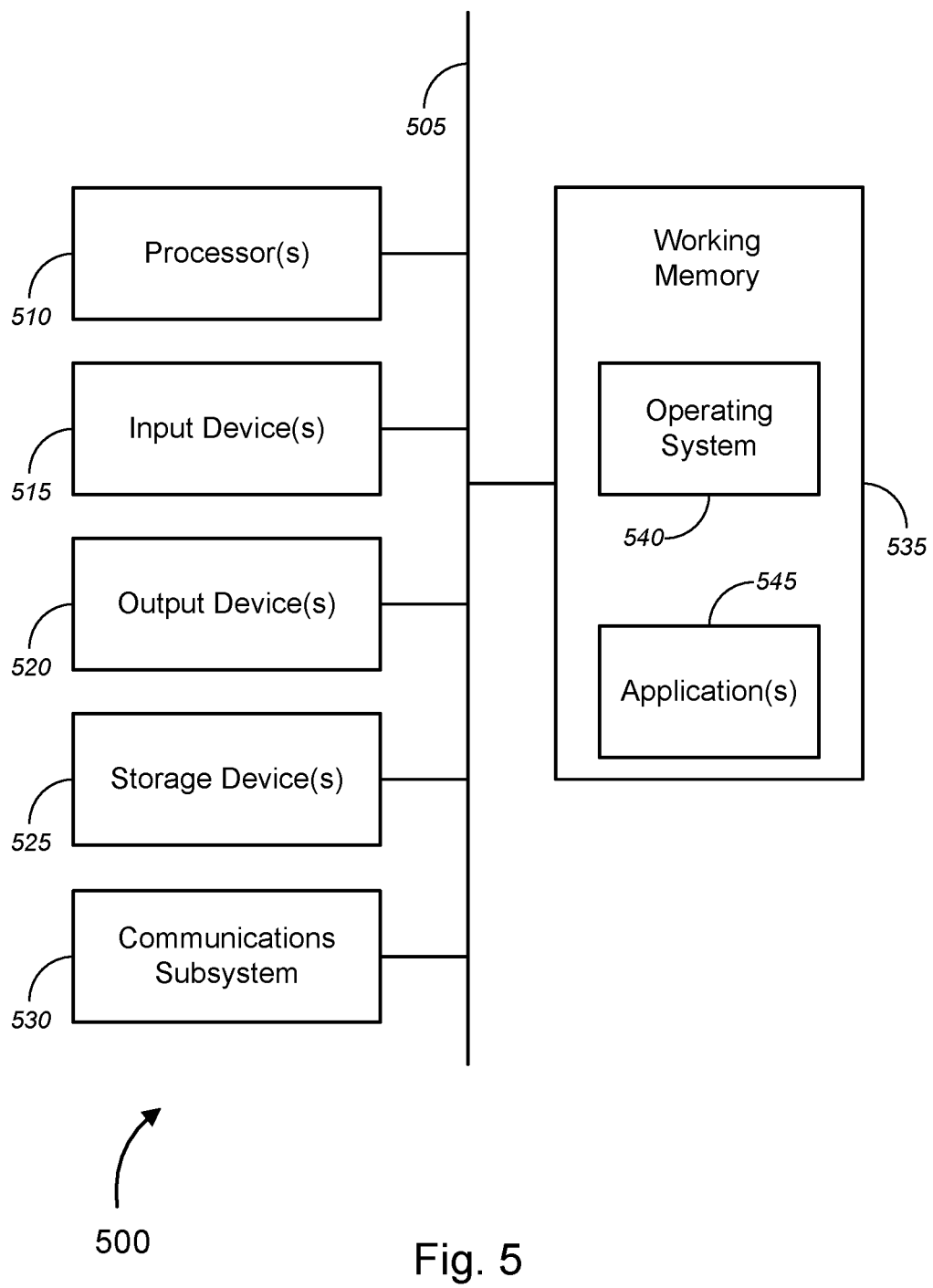
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing system 105, domain name system ("DNS") resolvers 110, 110a-110n, 210a-210n, and 310a-310n, access control list ("ACL") or filter 115a, 115b, 215a-215c, and 315a-315c, cache 120, 220, and 320, threat intelligence system 125, 225, and 325, artificial intelligence ("AI")/machine learning ("ML") system 130, 230, and 330, authoritative nameserver 135, 235, and 335, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing system 105, DNS resolvers 110, 110a-110n, 210a-210n, and 310a-310n, ACL or filter 115a, 115b, 215a-215c, and 315a-315c, cache 120, 220, and 320, threat intelligence system 125, 225, and 325, AI/ML system 130, 230, and 330, authoritative nameserver 135, 235, and 335, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a Wi-Fi device, a WiMAX device, a wireless wide area network ("WWAN") device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, virtual machines ("VMs"), and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system, comprising:
a computing system of a domain name system ("DNS"), comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
  receive a first user datagram protocol ("UDP")-based DNS request, the first UDP-based DNS request comprising a source address and a query for a destination DNS record associated with at least one of a destination device in a network, a destination entity associated with the destination device, or a destination domain associated with the destination device or the destination entity;
  in response to receiving the first UDP-based DNS request, send a UDP-based response message to the source address, the UDP-based response message comprising an empty payload portion and a header portion containing truncate ("TC") flag that is set;
  when a first transmission control protocol ("TCP")-based DNS request corresponding to the first UDP-based DNS request is not received from the source address within a first predetermined period, cause one or more second UDP-based DNS requests from the source address to be blocked, the one or more second UDP-based DNS requests comprising the first UDP-based DNS request;
  when a first TCP-based DNS request corresponding to the first UDP-based DNS request is received from the source address within the first predetermined period, allow, within a second predetermined period after receiving the first TCP-based DNS request, at least the first UDP-based DNS request from the source address to be processed, by sending, to the source address, at least a TCP-based response message comprising an answer to the query for the destination DNS record:
  receive, from the source address, one or more third UDP-based DNS requests, after the second predetermined period:
  analyze, using a machine learning model, the one or more third UDP-based DNS requests, to determine whether or not to block the one or more third UDP-based DNS requests; and
  perform one or more DNS tasks based on the analysis.

2. The system of claim 1, wherein the computing system comprises at least one of a DNS resolver, a DNS recursive resolver ("recursor"), a DNS root nameserver, a top level domain ("TLD") nameserver, an authoritative nameserver, a threat intelligence system, a threat mitigation system, a server, an artificial intelligence ("AI") system, a machine learning ("ML") system, a virtual machine ("VM"), or software running on the computing system.

3. The system of claim 1, wherein the source address comprises at least one of a source port or a source IP address.

4. The system of claim 1, wherein causing the one or more second UDP-based DNS requests from the source address to be blocked comprises at least one of:
  updating one or more rules of at least one access control list ("ACL") to deny access to the network to the source address;
  dropping all DNS requests from the source address; or
  filtering all DNS requests from the source address.

5. A method, comprising:
  receiving, by a computing system of a domain name system ("DNS"), a first user datagram protocol ("UDP")-based DNS request, the first UDP-based DNS request comprising a source address and a query for a destination DNS record associated with at least one of a destination device in a network, a destination entity associated with the destination device, or a destination domain associated with the destination device or the destination entity;
  in response to receiving the first UDP-based DNS request, sending, by the computing system, a UDP-based response message to the source address, the UDP-based response message comprising an empty payload portion and a header portion containing a truncate ("TC") flag that is set;
  when a first transmission control protocol ("TCP")-based DNS request corresponding to the first UDP-based DNS request is not received from the source address within a first predetermined period, causing, by the computing system, one or more second UDP-based DNS requests from the source address to be blocked, the one or more second UDP-based DNS requests comprising the first UDP-based DNS request;
  when a first TCP-based DNS request corresponding to the first UDP-based DNS request is received from the source address within the first predetermined period, allowing, by the computing system and within a second predetermined period after receiving the first TCP-based DNS request, at least the first UDP-based DNS request from the source address to be processed, by sending, to the source address, at least a TCP-based response message comprising an answer to the query for the destination DNS record;
  receiving, by the computing system and from the source address, one or more third UDP-based DNS requests, after the second predetermined period;
  analyzing, by the computing system and using a machine learning model, the one or more third UDP-based DNS requests, to determine whether or not to block the one or more third UDP-based DNS requests; and
  performing, by the computing system, one or more DNS tasks based on the analysis.

6. The method of claim 5, wherein the computing system comprises at least one of a DNS resolver, a DNS recursive resolver ("recursor"), a DNS root nameserver, a top level domain ("TLD") nameserver, an authoritative nameserver, a threat intelligence system, a threat mitigation system, a server, an artificial intelligence ("AI") system, a machine learning ("ML") system, a virtual machine ("VM"), or software running on the computing system.

7. The method of claim 5, wherein causing the one or more second UDP-based DNS requests from the source address to be blocked comprises at least one of:
  updating, by the computing system, one or more rules of at least one access control list ("ACL") to deny access to the network to the source address;
  dropping, by the computing system, all DNS requests from the source address; or
  filtering, by the computing system, all DNS requests from the source address.

8. The method of claim 5, wherein the source address comprises at least one of a source port or a source IP address.

* * * * *